United States Patent [19]
Wengler et al.

[11] Patent Number: 6,117,565
[45] Date of Patent: Sep. 12, 2000

[54] BABBITTED BEARING HAVING AN IMPROVED BONDING LAYER AND A METHOD OF DEPOSITING SAME

[75] Inventors: Donald J. Wengler, San Bruno; Thomas A. Packman; Sue F. Troup-Packman, both of Calabasas, all of Calif.

[73] Assignee: Pioneer Motor Bearing Co., South San Francisco, Calif.

[21] Appl. No.: 08/653,473

[22] Filed: May 24, 1996

[51] Int. Cl.$^7$ .............................. B32B 15/18; F16C 33/12
[52] U.S. Cl. .......................... 428/644; 428/648; 428/676; 428/681; 428/935; 384/912
[58] Field of Search ..................... 428/647, 648, 428/645, 676, 935, 644, 681; 384/912

[56] References Cited

U.S. PATENT DOCUMENTS

| | | |
|---|---|---|
| 4,978,587 | 12/1990 | Mori et al. .............................. 428/645 |
| 5,434,012 | 7/1995 | Tanaka et al. ........................... 428/643 |

OTHER PUBLICATIONS

Bardet, et al., "Babbitting," ASM Handbook, Vol. 5, Surface Engineering, pp. 373–377, Dec. 1994.
Technical Databook, M & T Chemicals, Inc., "M&T Nickel–Iron III Plating Process," Aug. 1980.
Troup–Packman, S., "Iron Plating," ASM Hanbook, vol. 5, pp. 213–214, Dec. 1994.
Williams, R.H., "Iron Plating," Journal Unknown, pp. 225–226, date prior to 1995.

*Primary Examiner*—John J. Zimmerman
*Attorney, Agent, or Firm*—Coudert Brothers

[57] ABSTRACT

A babbitted bearing is disclosed. The babbitted bearing includes a bearing backing and a layer of iron electroplated to the backing. A layer of babbitt material is bonded to the layer of electroplated iron. The electroplated layer provides a favorable bond between the babbitt material and the bearing backing.

5 Claims, 1 Drawing Sheet

BABBITTED BEARING HAVING AN IMPROVED BONDING LAYER AND A METHOD OF DEPOSITING SAME

FIELD OF THE INVENTION

The present invention relates to the field of babbitted fluid film bearing manufacture and repair, and more specifically with the field of electroplating a metallic layer onto a bearing backing which is to be babbitted.

BACKGROUND OF THE INVENTION

Industrial and utility bearings are produced in many sizes and configurations, but for the most part have some common structural elements related to the bearing backing and the soft metal or babbitt materials deposited thereon. Such bearings withstand difficult duty during operation. To understand what type of considerations are taken into account in the design of industrial bearings, it is helpful to look at the kind of operating conditions bearings can be subjected to. For example, a journal bearing for a 750 megawatt large steam turbine-generator low pressure rotor. Typically, such a rotor will have two bearings per span, together supporting upwards of 95 tons rotating at 1800 RPM and experiencing vibration of up to 2 mils peak-peak during regular operation. Due to a variety of circumstances, the vibration levels may exceed 2 mils under alarm conditions, with the unit set to trip off line at around 5 mils to avoid damage to the unit. At 5 mils peak-peak vibration, a journal bearing of 36 inch inside diameter takes a tremendous beating, yet must substantially maintain its surface and shape. Bearing failure at such extreme conditions may be disastrous, resulting in damage to the bearing journals requiring journal polishing or grinding costing several thousands of dollars and lost revenue, or even complete destruction of stationary pieces such as packing and seals, or even the rotor itself, requiring repairs in the millions of dollars.

Thrust bearings see a different duty, carrying the axial thrust of such rotors wanting to travel downstream with the steam flow, and in the event of failure, into stationary elements destroying them or even the rotor itself. Bearings near the generator of such a unit are even subjected to residual eddy currents sometimes causing etching of the metallic surface of the bearing. Bearings are particularly susceptible to conditions of lube oil systems such as oil temperature, flow or cleanliness, alignment of rotating components, and assembly of the bearing housing itself.

Since bearings are so critical to the proper operation of a variety of equipment, much attention has been paid to the design of bearings, bearing housings, lubrication systems and bearing metal surface configuration. Bearings can be found with elliptical or circular inside diameters, tilting pads, holes for jets of oil from lift pumps to allow extremely heavy rotors to begin rotation on an oil film, and self-aligning spherical seated rings to allow the bearing to react to the expansion, contraction and elevational changes of the rotor it supports.

Regardless of the varying configurations just mentioned, representing a small fraction of those in use, or the extreme duty described above, a common denominator exists with nearly all babbitted bearings: the critical importance of the integrity of the bond between the soft bearing babbitt or "white metal" and the bearing backing or shell to which it is attached. Because bearings see such extreme duty, degrading over time due to oil conditions or even the opening up of bearing clearance from wear or pounding, the composition of the babbitt and, more importantly, the integrity of the bond are critical to the reliable operation of the bearing.

Babbitting is a process named after Isaac Babbitt who patented a process in the United States in 1863, for bonding soft metals to a stronger shell or stiffener used to support the weight and torsion of a rotating, oscillating or sliding shaft. The soft metal prevents galling or scoring of the shaft for long periods. Babbitt materials are generally comprised of tin alloys or lead alloys, each usually combined with copper for ductility and antimony for hardness, and arsenic for hardness in the case of lead alloys. The base metal may be in the form of mild steel strip unwound from a coil, a half-round mild steel pressing or bushing, or castings or forgings of iron, steel or bronze. The bonded bimetal material is formed and machined to make plain, fluid film lubricated bearings for a wide variety of automotive, industrial and marine applications.

Babbitting of bearing backings and shells can be accomplished typically by either statically casting, centrifugally casting or tig welding the babbitt onto the backing. Centrifugal ("spin") casting of journal bearings offers both technical and often economic advantages. Thrust bearings, usually flat but sometimes in the form of "tapered land" bearings, are generally statically cast. The pads from tilting pad journal bearings are also generally centrifugally cast. In the case of pad-type bearings, the pad may have a base material consisting of steel, iron, bronze, copper or copper-chromium alloys such as that specified for use by the Westinghouse Electric Corporation under the trade name "cupalloy," or as specified by the common copper alloy material specification CDAC 18200, or its equivalent.

Regardless of the method of depositing babbitt onto the backing, the quality of the babbitt to backing bond is particularly important. A metallurgical or chemical bond is required to ensure good heat transfer from the babbitt into the backing and provide satisfactory babbitt fatigue life. Dovetails and tapped holes are commonly used in cast iron shells to provide a mechanical bonding of the babbitt metal, and are commonly used in concert with chemical bonding to further ensure retention of the babbitt on the backing.

Prior to casting, the workpiece is meticulously prepared by various cleaning, fluxing and tinning steps. A good description of the preparation steps for babbitting such bearings can be found in "Babbitting", Volume 5, *Surface Engineering*, in the trademarked ASM HANDBOOK®, ISBN 0-87170-384-X, by William P. Bardet and co-inventor of the instant invention, Donald J. Wengler.

Environmental concerns and constraints have caused industry to avoid the use of lead alloys for babbitt in favor of tin alloys. In the case of copper or copper-chromium alloy tilt pads, a problem arises between the pad, acting as the bearing backing in this case, and the babbitt material. If a copper or copper-chromium pad is tinned and babbitted, there occurs a migration of tin into copper forming an intermetallic layer of typically $Cu_6Sn_5$ or $Cu_5Sn_4$. When molten tin is applied directly to steel backings, the tin layer will not grow after solidification, but in the copper alloy pad, the resulting intermetallic layer will continue to grow even after solidification. This growth is further stimulated by elevated temperature, and growth may continue until the intermetallic layer ultimately fractures due to its brittle nature. Fracturing of the intermetallic layer results in a lack of bond between the babbitt and the backing. Most original equipment manufacturers (OEM's) and the United States Department of Defense require that there be a minimum of a 90% and as much as 100% bonding (given the specific area of bond evaluated) of the babbitt to the backing as determined by non-destructive testing methods, such as ultrasonic examination. Repairing a discrete area of lack of bond or babbitt surface damage is sometimes done by "puddling" an amount of molten babbitt into a prepared area of the backing, and then resurfacing the puddled babbitt. However, many OEM's require repairs to include a completely new casting of babbitt because of the localized heating of the puddled babbitt and its inherent metallurgical difference from the original babbitt material, which has changed physically due to operational influences.

While various layer material compositions have been employed to minimize this copper-tin migration problem, none has succeeded completely. Nickel has been used by bearing manufacturers to minimize the problem with some success, but the migration of copper and tin toward each other still occurs, even if at a lower rate, due to the similar migration characteristics of tin and nickel. What is needed then is a metallic barrier layer which will provide an electro-chemical and/or mechanical bond between the babbitt and the copper or copper-chromium alloy, while eliminating the migration of copper and tin to form $Cu_6Sn_5$ or $Cu_5Sn_4$. To date, the prior art has not taught such a barrier layer.

While plating the bearing backing with a nickel alloy is currently a common method of depositing a barrier layer material, nickel requires a plating process that is expensive and of higher environmental impact due to the toxicity of the process byproducts and the cost to mitigate potential dangers and dispose of hazardous waste. What is needed then is a metallic barrier material which is less toxic and which employs a plating process which has a reduced impact on the environment.

Iron may be deposited from a variety of electrolytes and is also a quite inexpensive metal. A good discussion of iron and iron plating processes can be found in the article "Iron Plating", by Sue Troup-Packman, co-inventor of the instant invention, Volume 5, ASM HANDBOOK®, cited above. Many of the electrolytes used in iron plating are very corrosive however. Common iron plating methods are typically too fast and aggressive for such an application as bearing bonding layers, depositing too much material of a lower density. Because of the good bonding properties of iron relative to copper-chromium or copper and tin alloys, a process of depositing iron via a less toxic process onto a backing and thereby enabling a bond resistant to the formation of $Cu_6Sn_5$ or $Cu_5Sn_4$, would constitute a novel and advantageous approach to bearing manufacture and repair.

SUMMARY OF THE INVENTION

Broadly stated, the present invention encompasses a bearing having a layer of iron deposited between the backing and the babbitt material sufficient to prevent tin or copper migration between the copper or copper-chromium alloy bearing backing and the babbitt. The present invention further encompasses methods of electroplating iron onto a copper or copper-chromium alloy bearing backing.

Applicant's process of electroplating iron onto a copper or copper-chromium alloy is partly achieved through the stabilizing of a ferrous chloride solution by the addition of carbonate. In a preferred embodiment, by adding calcium carbonate to a ferrous chloride bath to achieve a pH of approximately 0.5 to 4.0 at about 70° C. to 75° C., a less excited state of iron is achieved compared to typical iron plating processes, enabling a user to achieve a slow deposition of iron which will prevent the migration of copper and tin to form $Cu_6Sn_5$ or $Cu_5Sn_4$.

The preferred embodiment employs an electrolytic solution which is environmentally sensitive, and which will not produce inordinate amounts of hazardous waste due in part to adjustment of the pH. In addition, iron of varying properties may result from Applicants process, controlled by the stabilization of the ferrous chloride with carbonate, varying of solution pH, solution temperature and the use of a combination of typical addition agents such as wetting, hardening and stress reducing agents. In a preferred embodiment, the iron layer is at least approximately 0.0005" to 0.003" thick.

DETAILED DESCRIPTION OF THE INVENTION

Figure 1:
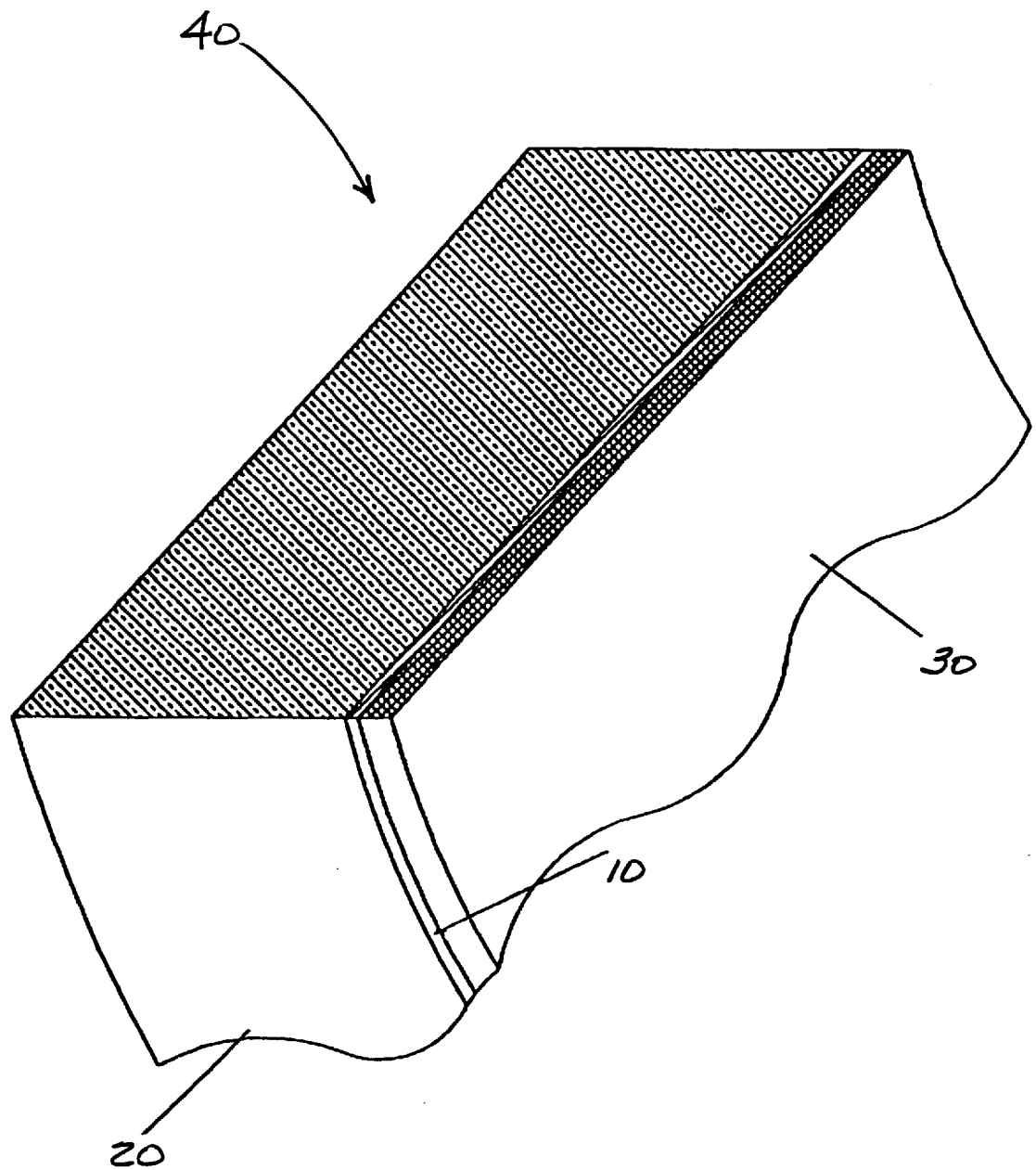
FIG. 1 is a cross sectional view of a babbitted bearing showing the backing, the babbitt and an interlayer of iron deposited therebetween according to the Applicants' process.

In a preferred embodiment of a babitted bearing 40 as shown in FIG. 1, to electroplate a thin layer (approximately 0.0005" to 0.003") of iron 10 onto a copper or copper-chromium alloy pad or bearing backing 20, for retention of a babbitt layer 30, a bath of ferrous chloride is prepared. At time of purchase, most ferrous chloride has a specific gravity of approximately 1.34 to 1.42 and a pH of approximately 0.7. To establish the plating bath, a clean 55 gallon barrel is filled to ⅔ capacity with ferrous chloride. While mixing the solution gently, calcium carbonate is added until the pH reaches approximately 0.5 to 4.0 measured at room temperature. The solution is allowed to settle over night, afterward siphoning the clear liquid to a plating tank of adequate capacity, for example 250 gallons, and repeating the process until the tank is filled to a desired capacity. Care is taken to prevent particulate in the form of sludge, which may constitute ⅓ of the material, from entering the plating tank.

According to the preferred embodiment, the solution in the tank is heated to approximately 100° F. to 125° F. and is circulated through a graduated filtration system using bag filters from 100 microns down to 3 microns until the bath is a clear emerald color. If the pH needs to be adjusted upward, calcium carbonate should not be directly added to the plating tank. Instead, a portion of liquid may be removed from the tank, adjusted, allowed to fully settle and then siphoned back into the tank. The pH of the two liquids will generally be slightly different, such that when the adjusted liquid is added back, some cloudiness may occur requiring additional filtration to remove the cloudiness.

The pH of the bath should be checked and adjusted to achieve a pH of near 1.0 at 75° C., and an iron concentration at 28%. At 75° C., the bath is ready for use.

Again referring to the preferred embodiment, the plating process begins with filtration of the bath using 3 micron filter bags, preferably for at least 4 hours. Temperature should be checked to maintain approximately 70° C. to 75° C. with a pH in the range of approximately 0.5 to 4.0. In the preferred embodiment, the solution is clear and emerald green in color.

Approximately 12 certified pure iron anode bars (3 per side) are placed around and inside the tank from an anode bar which is electrically connected to the positive side of a common electroplating power source and rectifier circuit. The bars may be grit blasted to remove oxides. A cathode rack is then arranged across the tank and connected to the negative side of said circuit.

Using ¼" minimum diameter copper hooks, a "dummy" cathode is suspended from the rack and into the plating solution. The dummy is typically corrugated sheet metal with any galvanizing removed.

The power control for the plating process is turned on and the plating voltage adjusted to 1 volt, with the current set at a value calculated at approximately 30 amperes per square foot of surface to be plated. Plating for approximately four hours should yield a uniform gray color at both the peaks and valleys of the corrugated material. In this way, unwanted metals are deposited onto the dummy part. Once finished, the bath is ready to use with bearing backings according to a preferred embodiment.

The target surface to be plated should be relatively clean and free from oils and oxidation, and positioned on the rack so that the target surface is directed toward the anodes during the electroplating process. For a shell having an annular inside diameter to be plated, a rotary anode may be used near the center of the annulus.

For some parts, finished surfaces may need to be protected from the electroplating process. This may be accomplished by applying a minimum of two coats of "MICROSHIELD" or other adequate masking material, which is allowed to dry according to manufacturer's instructions. Holes or crevices not to be plated can be plugged.

The surface to be plated may be machined to achieve an optimal bond. In a preferred embodiment, success has been achieved with a high speed tool ground at a 90° angle with a minimum 3/64" nose radius. A feed rate of less than 0.020" per revolution may be used for actual cutting. Surface cutting speeds of 125 to 150 FPM are normally used in the machining process. Removal of sharp edges from the target surface improves results. A 1/32 " chamfer has been successfully utilized for removal of such sharp edges.

Prior to immersion in the plating solution, the parts are typically washed with a caustic agent to remove grease and oils. The cleaning agent is typically allowed to work on the cold surface for around 10 minutes and then the surface is scrubbed with a clean wire brush and finally rinsed with clean deionized water. Once parts are clean, they should be immersed in the plating solution before they dry.

The workpiece is submerged in the plating solution and suspended on copper racking hooks adequate in size to support the weight and carry amperage necessary for electroplating. If workpieces are too heavy to lift by hand, they can be suspended from an overhead crane and connected to the negative line by the racking hooks. The workpiece is allowed to stabilize with bath temperature.

The circuit is energized and adjusted using the calculated 30 amps per square foot of plating area value to accomplish the desired coating. The workpiece is allowed to plate long enough to apply approximately a 0.0005" to 0.003" thickness of iron to the desired surface, which generally takes 30 to 45 minutes. The workpiece is removed from the solution, suspended over the tank and rinsed with deionized water, allowing the rinse water to drain back into the plating tank. If the barrier thickness is as desired, then the backing is babbitted using normal babbitting practices.

The result of the process is a barrier layer of iron bonded to the bearing backing, for example copper-chromium or copper alloy, which prevents copper and tin migration and the formation of $Cu_6Sn_5$ or $Cu_5Sn_4$. The electrolyte bath is stabilized by the use of calcium carbonate (lime) and is environmentally advantageous over typical iron plating and nickel plating solutions.

It is anticipated that Applicant's process may be used in applications in addition to depositing a barrier layer for babbitted bearings given the ability to control iron deposition with the described stabilized bath, by controlling pH, temperature and by using typical addition agents as are commonly used in the plating industry.

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A babbitted bearing comprising:
   a bearing backing;
   a first layer of iron electroplated to said backing, wherein the first layer has a thickness of approximately 0.0005" to 0.003"; and
   a second layer of babbitt material bonded to said first layer.

2. The babbitted bearing of claim 1 wherein:
   said backing comprises a copper alloy.

3. The babbitted bearing of claim 2 wherein:
   said copper alloy includes a copper-chromium alloy.

4. The babbitted bearing of claim 1 wherein:
   said first layer has a density and thickness which prevents the formation of $Cu_6Sn_5$ or $Cu_5Sn_4$.

5. The babbitted bearing of claim 4 wherein:
   said density is a specific gravity in the range of approximately 7.8 to 7.9.

* * * * *